UNITED STATES PATENT OFFICE.

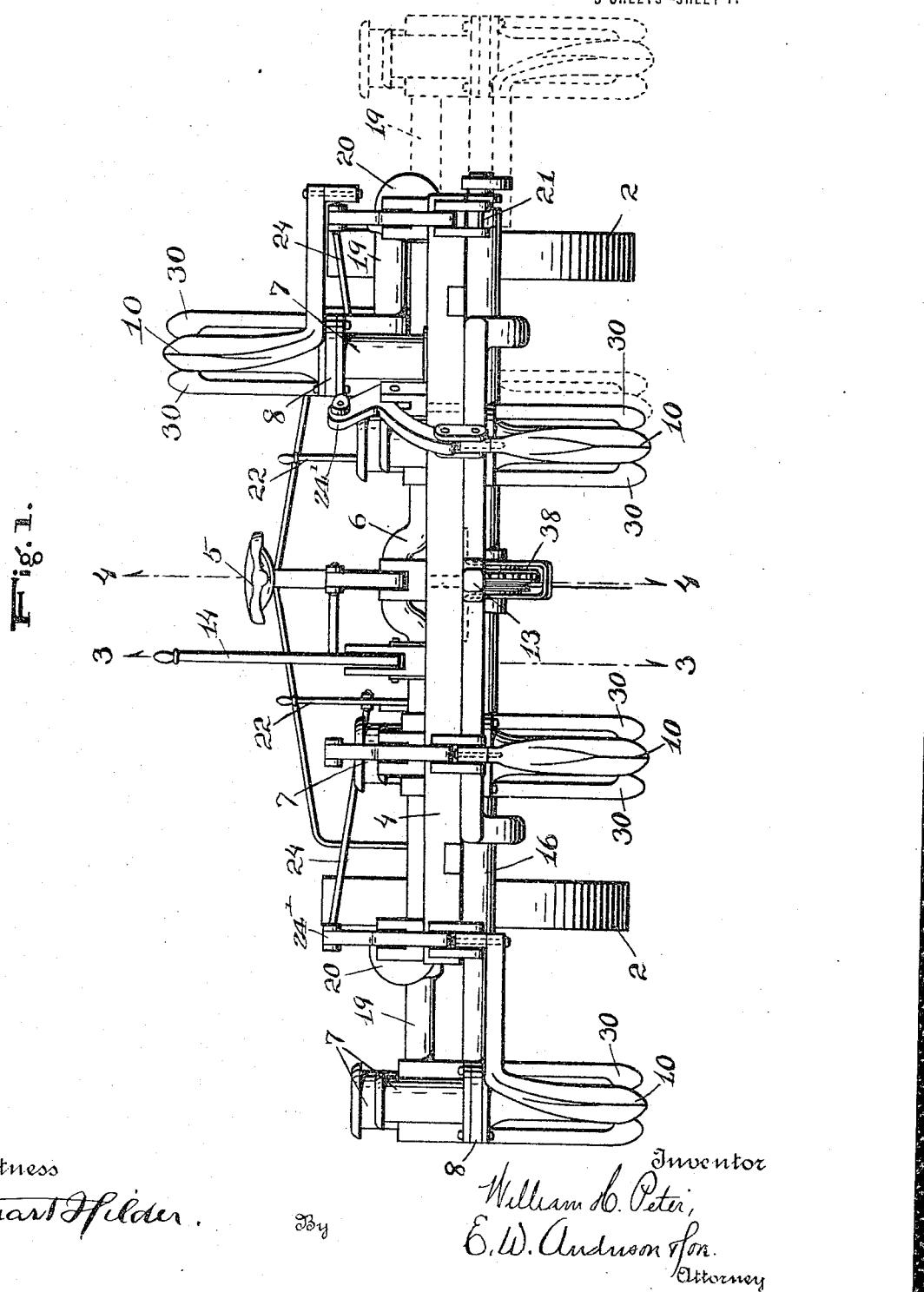

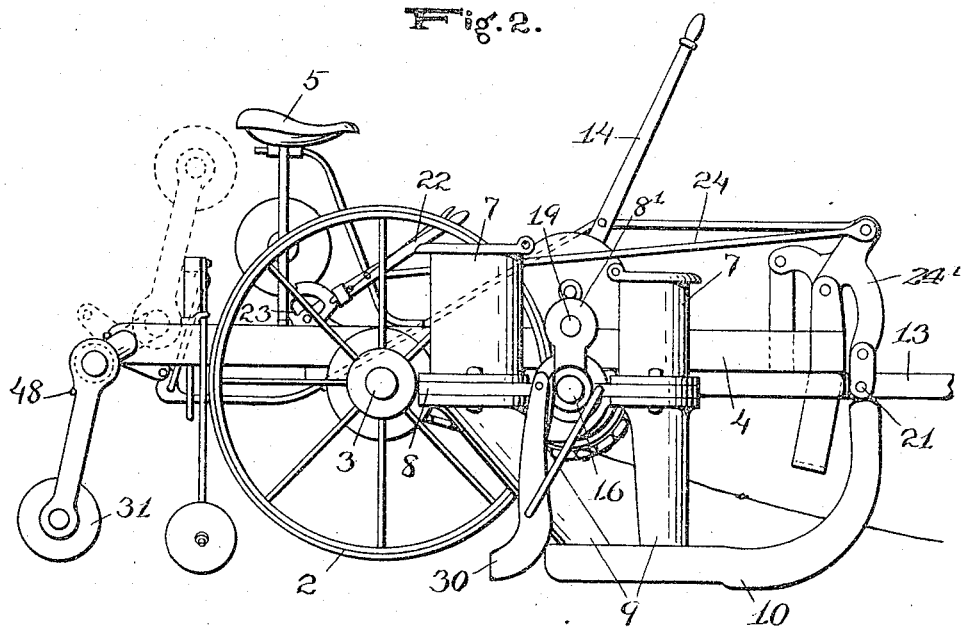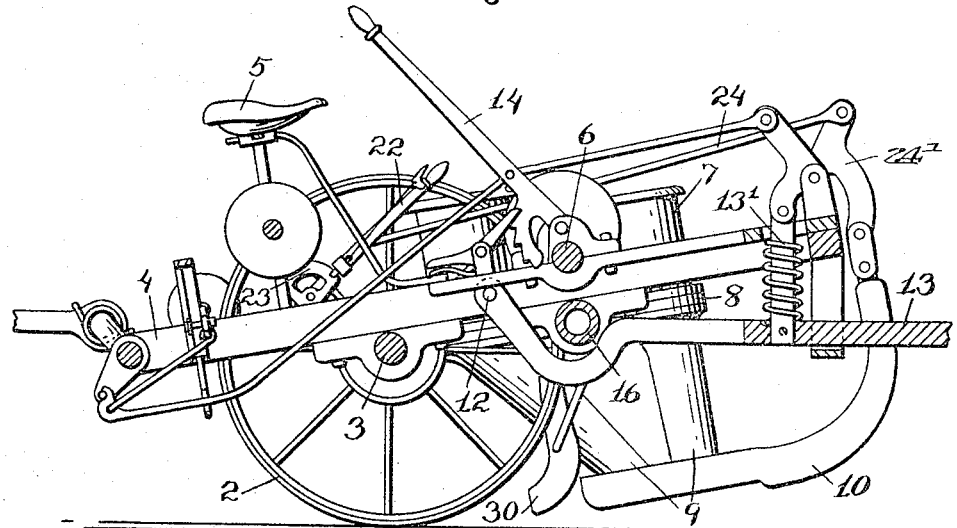

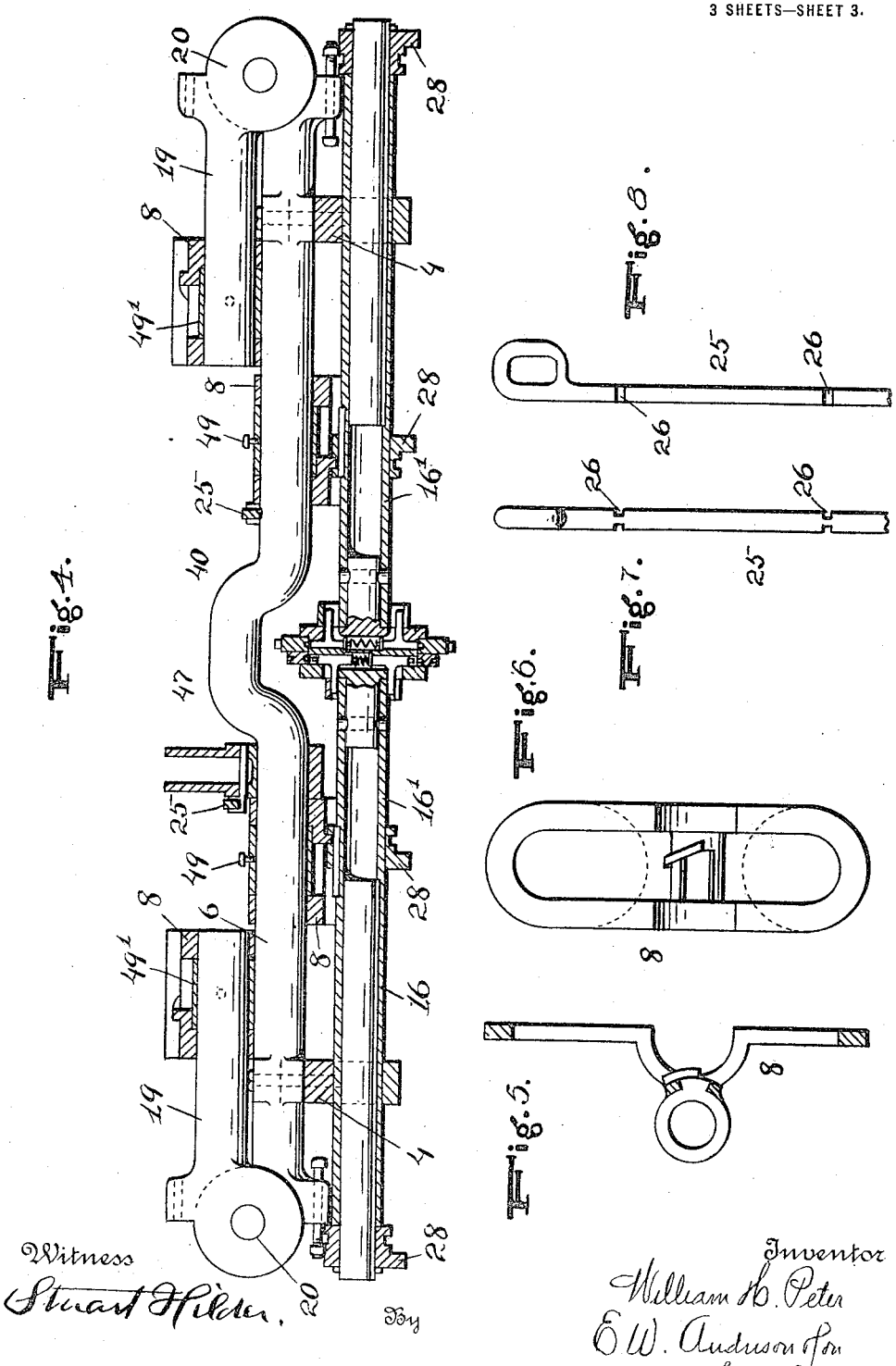

WILLIAM H. PETER, OF NORFOLK, VIRGINIA.

SEED-PLANTER.

1,209,329.  Specification of Letters Patent.  Patented Dec. 19, 1916.

Application filed March 11, 1916. Serial No. 83,616.

*To all whom it may concern:*

Be it known that I, WILLIAM H. PETER, a citizen of the United States, resident of Norfolk, in the county of Norfolk and State of Virginia, have made a certain new and useful Invention in Seed-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a rear view of the machine, with the outermost hopper frame at one side and the parts carried thereby turned over upon the main frame. Fig. 2 is a side view of the machine, the flattening roller being shown as completely raised in dotted lines. Fig. 3 is a section on the line 3—3, Fig. 1, partly broken away, showing the main frame raised at its forward end, the furrow opening shoes and coverer plows being raised therewith, and the flattening roller being shown as raised. Fig. 4 is a section on the line 4—4, Fig. 1, showing a hopper frame independently adjusted, the furrow opening shoe and coverer plow being adjusted therewith to raised position. Fig. 5 is a detail central vertical section of the hoppers and slide mechanism relating to a hopper frame. Fig. 6 is a section on the line 6—6, Fig. 5, with the end arms folded over upon the main frame and the outermost cams and their shafts slid inwardly. Fig. 7 is a detail central longitudinal section of a hopper frame. Fig. 8 is a detail plan view of the same. Fig. 9 is a detail front view of the handle rod. Fig. 10 is a detail side view of the same.

The invention has relation to planters, designed primarily for use in planting corn, having for its object the provision of a four row planter which is capable of adjustment to reduce its width, so that it may be transported upon ordinary roads.

Other objects and advantages will hereinafter appear.

The invention consists in the novel construction and combinations of parts, as hereinafter set forth.

In the accompanying drawings, illustrating the invention, the numeral 2 designates the carrying wheels, 3 the axle connecting said wheels, and 4 the main frame supported from said axle and carrying in turn the hoppers, the seat 5, the adjusting levers, etc.

A transverse frame bar 6 is supported from the main frame 4 and is provided with a plurality of hoppers 7, 7, these hoppers being arranged in pairs, the fertilizer hopper in rear and the seed hopper in front, one upon each side of said bar and carried by a hopper frame 8, pivoted to the frame bar at 8', each hopper having a downwardly extending chute 9, connected rigidly at the lower end to the furrow-opening shoe 10, which has an opening 11 therethrough for the chutes. Connected with the frame 4 pivotally at 12 is a draft pole 13, having interposed between the same and the frame 4 a coiled spring 13', means 14 being provided whereby the coiled spring will be allowed to expand and raise the frame 4 at its forward end, upon its axle connection as a center, the various runner shoes being at the same time raised out of and above the ground, so that they will not contact therewith as the machine is transported upon its carrying wheels.

The outermost of the hopper frames are pivoted to the frame bar through the medium of a horizontal arm 19, hinged to said bar at 20 and forming an extension thereof, said arm normally resting upon the bar, being capable of being turned over inwardly thereupon and carrying the hoppers and their attached runner shoe, the pivotal pin 21, connecting the hopper frame with the adjusting mechanism, being first removed. In this way the width of the machine is materially reduced and the machine rendered much more compact, for transportation and storage.

It is designed that any one of the hopper frames shall be independently adjustable, to raise the furrow shoes thereof out of and above the ground, a lever 22 having a spring pawl engaging a rack 23, and an operating connection 24 with the hopper frame, so that upon adjustment of the lever the frame is moved pivotally to raise the shoe, as shown in Fig. 4 of the drawings. Or, instead of the adjusting lever and its connections as stated, the hopper frames, or the inner of said frames, may be provided with a reciprocatory handle rod 25, having notches 26 wherein are engaged suitable teeth of the main frame, to hold the handle rod and the hopper frames as adjusted.

The connecting means between the levers 24 or rods 25 and the shoes, preferably bell crank levers 24', are mounted upon a forward transverse bar 4' of the main frame 4, and serve to stiffen the connection of the hopper frames with the main frame against the strains incidental to draftage; this being particularly desirable in the case of the outer, foldably mounted hoppers and shoes.

The hopper frames are slidably adjustable along the frame bar 6 and the horizontal arms 19, 19, the adjustment being fixed by said screws 49, seated in collars 49'.

Feeding devices 16, 27, 28, 29 are provided for intermittently dropping the seed corn or fertilizer.

Coverer plows 30 are provided immediately in rear of the furrow-opening shoes, and in rear of the machine flattening rollers 31 are provided, the former being rigidly secured to the hopper frame.

When the outermost hopper frames are folded over upon the main frame, the outermost cams for operating the feed slides are slid inwardly in a telescoping manner, out of the way.

I claim:

1. In a planter, a main frame and a plurality of hopper frames carrying furrow-opening shoes and having a slidable adjustment upon said main frame, the outer of the hopper frames and shoes being hinged to fold upon said main frame.

2. In a planter, a main frame having a transverse bar provided with lateral hinged extensions, and a plurality of hopper members upon said bar and the extensions thereof, said extensions with the hopper members thereupon being foldable to seated position upon said bar.

3. In a planter, a main frame having a forward transverse bar and a second transverse bar in rear thereof provided with lateral hinged extensions, hopper members upon said extensions, including furrow-opening shoes having inturned arms capable of attachment to said forward transverse bar in the longitudinal planes of the hinges of said extensions, the extensions with the hopper members and shoes thereupon being foldable to seated position upon said rear transverse bar.

4. In a planter, a main frame having a forward transverse bar and a second transverse bar in rear thereof provided with lateral hinged extensions, hopper members upon said extensions, including furrow-opening shoes having inturned arms, and vertically adjustable attachment means for said arms upon said forward transverse bar, the extensions with the hopper members and shoes thereupon being foldable to seated position upon said rear transverse bar.

5. In a planter, a main frame having a forward transverse bar and a second transverse bar in rear thereof provided with lateral hinged extensions, and a plurality of hopper members upon said bar and the extensions thereof, including furrow-opening shoes having adjustable attachment to said forward transverse bar, said extensions with the hopper members and shoes thereupon being foldable to seated position upon said rear transverse bar, and said hopper members being capable of independent pivotal adjustment upon said rear transverse bar.

6. In a planter, a main frame and a plurality of hopper frames carrying furrow-opening shoes, the outer of said hopper frames and shoes being hinged to fold upon said main frame, rear flattening rollers pivoted to said main frame, a marker arm pivoted upon said main frame, means of independent operative adjustment for each of said hopper frames, rollers and marker arm, and means of simultaneous operative adjustment for the same.

In testimony whereof I affix my signature, in presence of two witnesses.

WILLIAM H. PETER.

Witnesses:
R. C. PEIRCE,
S. C. MURPHY.

Copies of this patent may be obtained for five cents each, by addressing the "Commissioner of Patents, Washington, D C."